United States Patent
Zhang et al.

(10) Patent No.: US 11,694,004 B2
(45) Date of Patent: Jul. 4, 2023

(54) DYNAMIC OPTIMIZATION METHOD AND SYSTEM FOR PROCUREMENT SPECIFICATIONS OF BRIGHTNESS ENHANCEMENT FILM (BEF) RAW MATERIALS

(71) Applicant: Guangdong University of Technology, Guangzhou (CN)

(72) Inventors: Hao Zhang, Guangzhou (CN); Kanghong Wangsun, Guangzhou (CN); Qiang Liu, Guangzhou (CN); Lijun Wei, Guangzhou (CN); Yihui Hong, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/063,635

(22) Filed: Dec. 8, 2022

(65) Prior Publication Data

US 2023/0106993 A1 Apr. 6, 2023

(30) Foreign Application Priority Data

Dec. 9, 2021 (CN) .......................... 202111503430.1

(51) Int. Cl.
*G05B 19/4068* (2006.01)
*G06F 30/20* (2020.01)
(Continued)

(52) U.S. Cl.
CPC ......... *G06F 30/20* (2020.01); *G05B 19/4068* (2013.01); *G06Q 10/043* (2013.01); *G05B 2219/35162* (2013.01); *G06F 2111/04* (2020.01)

(58) Field of Classification Search
CPC . G06F 30/20; G06F 2111/04; G05B 19/4068; G05B 2219/35162; G06Q 10/043
See application file for complete search history.

(56) References Cited

U.S. PATENT DOCUMENTS

2002/0029370 A1 3/2002 Michalewicz et al.

FOREIGN PATENT DOCUMENTS

| CN | 104778513 A | 7/2015 |
|----|-------------|--------|
| CN | 106599519 A * | 4/2017 |

(Continued)

OTHER PUBLICATIONS

Wei Yang, Research on Optimal Approaches to Two-Dimensional Cutting Stock Problems based on Computational Intelligence, Engineering Science and Technology II of Full-text Database of Chinese Excellent Master's Theses.

(Continued)

*Primary Examiner* — Yuhui R Pan

(57) ABSTRACT

A dynamic optimization method for procurement specifications of BEF raw materials includes: obtaining finished product data; obtaining an initial feasible raw material size set; mapping the initial feasible raw material size set in length and width directions to obtain a complete feasible raw material size set; filtering an unreasonable raw material size out of the complete feasible raw material size set to obtain a final feasible raw material size set; and determining whether a scale of the final feasible raw material size set is larger than a threshold, if not, building and solving an integer programming model, and outputting results; and if yes, batchwise processing the final feasible raw material size set to obtain multiple subsets, and building an integer programming model for each subset, and solving the integer programming model, and outputting results. A dynamic optimization system of BEF is further provided.

10 Claims, 9 Drawing Sheets

(51) Int. Cl.
  *G06Q 10/04* (2023.01)
  *G06F 111/04* (2020.01)

(56) References Cited

FOREIGN PATENT DOCUMENTS

| CN | 106599519 | A |   | 4/2017  |           |
|----|-----------|---|---|---------|-----------|
| CN | 109272145 | A |   | 1/2019  |           |
| CN | 110991755 | A | * | 4/2020  | G06Q 10/043 |
| CN | 111783254 | A |   | 10/2020 |           |
| CN | 113065714 | A |   | 7/2021  |           |

OTHER PUBLICATIONS

Kang Kai et al., Research on multi-objective raw materials procurement with quantity discount under uncertain environment, Journal of Hebei University of Technology, vol. 47, No. 1, Feb. 2018.

* cited by examiner

DYNAMIC OPTIMIZATION METHOD AND SYSTEM FOR PROCUREMENT SPECIFICATIONS OF BRIGHTNESS ENHANCEMENT FILM (BEF) RAW MATERIALS

CROSS-REFERENCE TO RELATED APPLICATIONS

This application claims the benefit of priority from Chinese Patent Application No. 202111503430.1, filed on Dec. 9, 2021. The content of the aforementioned application, including any intervening amendments thereto, is incorporated herein by reference in its entirety.

TECHNICAL FIELD

This application relates to procurement of brightness enhancement film (BEF) raw materials, and more particularly to a dynamic optimization method and system for procurement specifications of BEF raw materials.

BACKGROUND

Brightness Enhancement Film (BEF) is an emerging high-performance optical film using the microprism-based gathering technology and the reflective polarizer-based light recycling technology, so that the brightness of the liquid crystal display (LCD) module is increased to 160%~220% of the original brightness, effectively solving the problems of low light energy utilization rate and short standby time of displays of mobile phones and iPads. Therefore, the BEF has become an indispensable component of the backlight liquid crystal module (LCM) of the display screen.

In recent years, the continuous increase in the screen size of the terminal display devices has contributed to the increasingly larger demand for BEFs. However, the procurement size and specification for the BEF raw materials are still selected manually based on experience. Generally, the size of purchased raw materials is optimized based on the statistical data and experience, which is inefficient and unreliable.

The existing methods cannot arrive at the systematical and global optimization, or realize the quick dynamic regulation of the procurement plan based on the fluctuation of order quantity, such that it fails to provide a preferable procurement plan in real time, resulting in low utilization rate, diverse procurement specifications, unreasonable size, and low product yield. For BEF, the cost of raw material accounts for about 60% of the total production cost, and the procurement time, procurement place and procurement quantity need to be scientifically determined to minimize the cost of raw materials. Therefore, improving the utilization rate of BEF raw materials for processing is of great significance to improve the competitiveness of BEF manufacturers.

The existing methods lack the establishment of an overall optimization model for procurement specifications, which will render the procurement plan unscientific and unreasonable, resulting in large inventory, and high procurement frequency. The existing methods generally lead to higher procurement costs. Thus, by improving the procurement mode, the procurement cost can be effectively reduced, facilitating realizing the optimal procurement of raw materials.

SUMMARY

An object of this application is to provide a dynamic optimization method and system for procurement specifications of BEF raw materials, in which an integer programming model is established based on a final feasible raw material size set to dynamically optimize the real-time order and inventory data, thereby generating the most reasonable raw material specification, raw material allocation scheme, and real-time raw material procurement plan.

Technical solutions of this application are described as follows.

In a first aspect, this application provides a dynamic optimization method for procurement specifications of brightness enhancement film (BEF) raw materials, including:

(a) obtaining finished product data according to order information within a preset period;

(b) according to the finished product data, generating an optimal raw material size corresponding to individual finished products to obtain an initial feasible raw material size set;

(c) mapping the initial feasible raw material size set in length and width directions to obtain a complete feasible raw material size set;

(d) removing an unreasonable raw material size from the complete feasible raw material size set to obtain a final feasible raw material size set; and (e) judging whether a scale of the final feasible raw material size set is larger than a preset threshold:

(e1) if not, building an integer programming model based on the final feasible raw material size set; solving the integer programming model, and outputting results; and (e2) if yes, performing batch processing on the final feasible raw material size set to obtain multiple subsets; building an integer programming model for each of the subsets; and solving the integer programming model, and outputting results.

In an embodiment, in the step (b), according to a finished product cutting rule, the optimal raw material size is derived by combining the finished products;

according to a finished product size and the number of single side blanks in both the length and width directions, the optimal raw material size is expressed by formulas (1) and (2):

$$W_{best} = x \times x\text{Num} + A \times (x\text{Num}+1) \qquad (1); \text{ and}$$

$$L_{best} = y \times y\text{Num} + A \times (y\text{Num}+1) \qquad (2);$$

wherein x is a length of each of the finished products; y is a width of each of the finished products; A is a spacing between a raw material and each of the finished products or between the finished products, xNum is the number of finished products in a length direction, and yNum is the number of finished products in a width direction.

In an embodiment, in the step (b), the initial feasible raw material size set of a certain finished product is obtained through steps of:

(b1) initializing xNum and yNum to 1;

(b2) calculating the optimal raw material size according to the formulas (1) and (2);

(b3) judging whether the optimal raw material size exceeds a raw material size limit:

if not, adding the optimal raw material size to the initial feasible raw material size set; keeping the number of finished products in the length direction at xNum, and adjusting the number of finished products in the width direction to yNum+1, and returning to the step (b2); and if yes, determining whether the optimal raw material size exceeds the raw material size limit in the length direction: if yes, outputting the optimal raw material size to obtain the initial feasible raw material size set; and if not, adjusting the number of finished products in the length direction to xNum+1, and resetting the number of finished products in the width direction to 1, and returning to the step (b2).

In an embodiment, finished product cutting and raw material selection are required to satisfy the following criteria:

the spacings between the finished products and a distance between each of the finished products and the raw material are both kept at A;

the finished products are aligned with and parallel to each other;

one piece of the raw material is only used to be cut into multiple finished products with the same size and rotation angle;

one finished product only corresponds to one type of raw material; and the raw material size is limited to $L_{min} \leq x \leq L_{max}$, and $W_{min} \leq y \leq W_{max}$.

In an embodiment, the step (c) includes:

mapping a length x and a width y of each raw material in the initial feasible raw material size set onto two coordinate axes perpendicular to each other, respectively, to obtain a length x set and a width y set; and combining elements in the length x set with elements in the width y set in pairs to obtain the complete feasible raw material size set;

in the step (c), assuming that all initial feasible raw material sizes in the initial feasible raw material size set are [L1, W1], [L2, W2], [L3, W3], and [L4, W4], and the length x set and the width y set generated by mapping the length x and width y of the initial feasible raw material sizes in the initial feasible raw material size set onto the two coordinate axes perpendicular to each other are respectively {L1, L2, L3, L4} and {W1, W2, W3, W4}; and the complete feasible raw material size set obtained by combining elements in the set {L1, L2, L3, L4} with elements in the set {W1, W2, W3, W4} in pairs consists of [L1, W1], [L1, W2], [L1, W3], [L1, W4], [L2, W1], [L2, W2], [L2, W3], [L2, W4], [L3, W1], [L3, W2], [L3, W3], [L3, W4], [L4, W1], [L4, W2], [L4, W3], and [L4, W4].

In an embodiment, the step (d) includes:

(d1) selecting a first element in the complete feasible raw material size set as an initial test object;

(d2) determining whether there is a cuttable finished product for a current test object: if yes, proceeding to step (d3); otherwise, proceeding to step (d4);

(d3) determining whether there is at least one element in the complete feasible raw material size set whose utilization rate for each finished product is higher than a utilization rate of the current test object: if yes, proceeding to step (d4); otherwise, proceeding to step (d5);

(d4) removing the current test object from the complete feasible raw material size set;

(d5) determining whether the complete feasible raw material size set has been traversed: if yes, proceeding to step (d7); otherwise, proceeding to step (d6);

(d6) selecting a next element in the complete feasible raw material size set as a current test object and returning to step (d2); and (d7) completing deletion of the unreasonable raw material size.

In an embodiment, the integer programming model is built through steps of:

building a first objective function according to quantity and type of a known finished product, wherein the first objective function is configured to minimize a total area of raw materials consumed for cutting of all finished products, expressed as:

$$\text{Minimize } Z_1 = \sum_{j=1}^{n} \sum_{i=1}^{m} (x_{ij} \times S_j \times u_{ij}); \quad (3)$$

building a second objective function, wherein the second objective function is configured to minimize procurement types of the raw materials, expressed as:

$$\text{Minimize } Z_2 = \sum_{j=1}^{n} y_j; \text{ and} \quad (4)$$

establishing a multi-objective integer programming model according to the first objective function and the second objective function; obtaining an integrated target, by multiplying the first objective function by a weight coefficient $k_1$ and multiplying the second objective function by a weight coefficient $k_2$, to transform a multi-objective problem into a single-objective problem, expressed as:

$$\text{Minimize } Z = k_1 \times Z_1 + k_2 \times Z_2 \quad (5);$$

wherein there are three constraints for the integrated target;

constraint 1: each type of finished products matches only one raw material size, expressed as:

$$\sum_{j=1}^{n} x_{ij} = 1, \forall i; \quad (6)$$

constraint 2: when a raw material matches with at least one type of finished products, $y_j=1$, indicating that the raw material is selected:

$$\sum_{i=1}^{m} x_{ij} \leq y_j \times \infty, \forall j; \text{ and} \quad (7)$$

constraint 3: variables are limited as follows:

$$\begin{cases} x_{ij} \in [0, 1] \\ y_j \in [0, 1] \end{cases}; \quad (8)$$

wherein x is a length of a finished product; y is a width of the finished product;

$y_j$ represents whether a j-th raw material is used; $x_{ij}$ represents whether the j-th raw material is selected for an i-th finished product;

$i \in (1, 2, \ldots, m)$ is a serial number of a finished product, indicating that it is required to allocate raw materials to m finished products;

$j \in (1, 2, \ldots, n)$ is a serial number of a feasible raw material size, indicating that there are n feasible raw material sizes for allocation;

$u_{ij}$ represents the number of j-th raw materials for cutting the i-th finished product; and $S_j$ is an area of the j-th raw material.

In an embodiment, in the step (e1) or (e2), the integer programming model is solved by a mathematical optimization technique integrating a minimum finished product utilization limit strategy and a batch recursive processing strategy;

a minimum utilization threshold is set, and raw materials with a utilization rate below the minimum utilization threshold are discarded by an equation constraint, and the integer programming model is solved to ensure that a minimum utilization rate of the raw materials is greater than the minimum utilization threshold:

$$\begin{cases} x_{ij} = 0, \eta_{ij} < rateLimit \\ x_{ij} \in [0, 1], \eta_{ij} \geq rateLimit \end{cases} \quad (9)$$

wherein $\eta_{ij}$ represents the utilization rate of the raw material when producing the i-th finished product from the j-th raw material, and rateLimit is a lower limit of a raw material utilization rate.

In an embodiment, in step (e2), the integer programming model is solved by the batch recursive processing strategy through the following steps:

(e21) mapping the final feasible raw material size set to an x set and a y set, and subjecting the final feasible raw material size set to deduplication respectively with respect to length and width to obtain an X set and a Y set;

(e22) extracting some elements from the X set at equal intervals followed by full permutation with all elements in the Y set to obtain a feasible raw material size subset;

(e23) determining whether an optimal solution set is empty; if yes, indicating that it is a first batch solution operation, and proceeding to step (e25); otherwise, proceeding to step (e24);

(e24) adding an optimal solution to the optimal solution set;

(e25) performing point deletion on the feasible raw material size subset;

(e26) solving the feasible raw material size subset to obtain an optimal solution of the feasible raw material size subset; and (f7) determining whether all elements in the X set have been extracted: if yes, determining an optimal solution of a current subset as an optimal solution of an original problem, and outputting the optimal solution of the current subset; otherwise, returning to the step (e22); wherein the original problem is a problem where the final feasible raw material size set is directly used as algorithm input before batch processing.

This application further provides a system for of BEF implementing the dynamic optimization method.

This application has the following beneficial effects.

A dynamic optimization method for procurement specifications of BEF raw materials based on an integer programming mathematical model can obtain the optimal solution quickly within a certain scale and has good scalability. The integer programming model is established based on the final feasible raw material size set, to dynamically optimize the real-time order and inventory data, thereby generating the most reasonable raw material specification, raw material allocation scheme, and real-time raw material procurement plan.

The dynamic optimization method provided herein adjusts and dynamically optimizes the procurement specifications of the raw materials based on the dynamic fluctuation of the BEF's order. The dynamic optimization method can optimize and generate automatically the most reasonable raw material procurement plan according to the future production order information, thereby improving the utilization rate and reducing the raw material specifications. The dynamic optimization method can provide the raw materials with the best utilization and the corresponding cutting/blanking layout solutions for each product to improve product yield. The dynamic optimization method can further accurately calculate the usage amount of raw materials, purchase raw materials in advance, and ensure inventory. The dynamic optimization method can save labor, help enterprises to obtain more accurate raw material size selection and distribution schemes in a shorter time, and improve enterprise production efficiency.

DETAILED DESCRIPTION OF EMBODIMENTS

Figure 1:
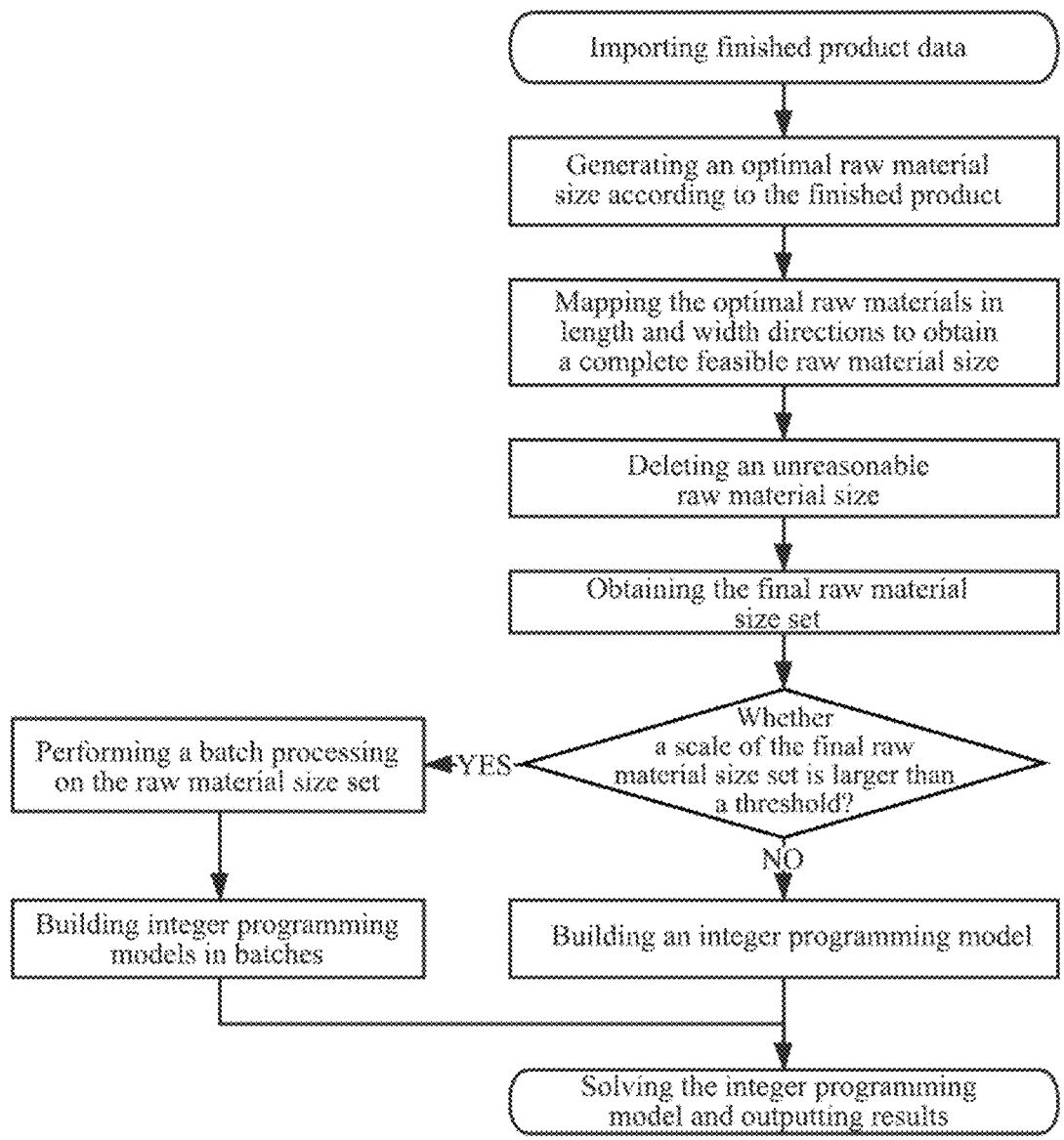
FIG. 1 is an overall flow chart of a dynamic optimization method for procurement specifications of BEF raw materials according to one embodiment of the present disclosure.

The technical solutions of the disclosure will be described in detail below in combination with the drawings and embodiments.

Embodiments of the disclosure are described in detail below and shown in the drawings, wherein the same or similar reference signs indicate the same or similar items or elements having the same or similar function. The following detailed description in combination with the drawings is merely illustrative, and is not intended to limit the scope of the disclosure.

As used herein, it should be understood that the orientation or positional relationship indicated by the terms "vertical", "horizontal", "upper", "lower", "front", "rear", "left", "right", "horizontal", "vertical", "top", "bottom", "inside", "outside", etc. is based on the orientation or positional relationship shown in the accompanying drawings, which is only for the convenience of describing the technical solutions and simplifying the description, rather than indicating or implying that the indicated device or element must have a specific orientation, be constructed or operated in a specific orientation. Therefore, these terms should not be understood as a limitation of the present disclosure. In addition, the terms "first" and "second" are merely descriptive, and cannot be understood as indicating or implying relative importance.

As used herein, unless otherwise stated, "multiple" means two or more.

As used herein, unless otherwise expressly specified and defined, terms, such as "mount", and "connect", should be understood in a broad sense, for example, it may be fixed connection, detachable connection, or integral connection; it may be mechanical direction or electrical connection; it may be direct connection or indirect connection through an intermediate medium; and it may be an internal communication between two members. For those skilled in the art, the specific meanings of the above terms can be understood according to specific situations.

As shown in FIGS. 1 to 10, a dynamic optimization method for procurement specifications of brightness enhancement film (BEF) raw materials includes steps (a) to (e2).

(a) According to order information within a preset period, finished product data is obtained.

(b) According to the finished product data, an initial feasible raw material size set is obtained by generating an optimal raw material size corresponding to individual finished products.

(c) A complete feasible raw material size set is obtained by mapping the initial feasible raw material size set in length and width directions.

(d) An unreasonable raw material size is removed from the complete feasible raw material size set to obtain a final feasible raw material size set.

(e) It is judged whether a scale of the final feasible raw material size set is larger than a preset threshold.

(e1) If not, build an integer programming model based on the final feasible raw material size set, solve the integer programming model, and output results.

(e2) If yes, perform batch processing on the final feasible raw material size set to obtain multiple subsets, build an integer programming model for each of the subsets, and solving the integer programming model, and outputting results.

BEF is an innovative high-performance optical film with microscopic prism array structure on the outer surface, also known as prism film. BEF is widely used in LCD backlight of electronic devices such as TVs, displays, flat panels, mobile phones, to improve the overall brightness of LCD, so as to achieve energy saving.

In the disclosure, when the number of groups of the combination of length and width of the raw material set is greater than 5000, the raw material set is considered as a large-scale set, that is, the preset threshold is 5000. When the number of groups is greater than 5000, the model is solved directly, and the speed is low. When the number of groups is less than or equal to 5000, the raw material set is considered a small-scale set.

BEF raw material has the following optimization procurement problem. According to the order number information (product size and number) in a certain period in the future, BEF manufacturers optimize and generate the corresponding raw materials (size and number) procurement plan. Specifically, under the premise of the type, size and number of finished products, it is necessary to select the appropriate raw materials and corresponding cutting schemes for each finished product, so that all finished products are cut using as few raw materials as possible, and the average raw material utilization rate is improved. At the same time, the variety of raw material sizes is not always better. Too many types will lead to the difficulty of classification and management of raw materials and increase management costs. Therefore, it is also necessary to use as few types of raw materials as possible to complete the cutting of all finished products.

The dynamic optimization method for the procurement specifications of BEF raw materials based on an integer programming mathematical model can obtain the optimal solution quickly within a certain scale and has good scalability. The integer programming model is established through the final feasible raw material size set, to dynamically optimize the real-time order and inventory data, thereby generating the most reasonable raw material specifications, raw material allocation schemes, and real-time raw material procurement plans.

The dynamic optimization method provided herein adjusts and dynamically optimizes the procurement specifications of the raw materials under the dynamic fluctuation of the BEF's order. The dynamic optimization method can optimize and generate automatically the most reasonable raw material procurement plan according to the future production order information, thereby improving the utilization rate and reducing the raw material specifications. The dynamic optimization method can provide the raw materials with the best utilization and the corresponding cutting/blanking layout solutions for each product to improve product yield. The dynamic optimization method can further accurately calculate the usage amount of raw materials, purchase raw materials in advance, and ensure inventory. The dynamic optimization method can save labor, help enterprises to obtain more accurate raw material size selection and distribution schemes in a shorter time, and improve enterprise production efficiency.

In an embodiment, in the step (b), according to a finished product cutting rule, the optimal raw material size (the raw material size with a highest utilization rate) is derived by combining the finished products.

According to a finished product size and the number of single side blanks in both the length and width directions, the optimal raw material size is expressed by formulas (1) and (2):

$$W_{best} = x \times x\text{Num} + A \times (x\text{Num}+1) \quad (1), \text{ and}$$

$$L_{best} = y \times y\text{Num} + A \times (y\text{Num}+1) \quad (2).$$

Wherein x is a length of each of the finished products; y is a width of each of the finished products; A is a spacing between a raw material and each of the finished products or between the finished products, xNum is the number of finished products in a length direction, and yNum is the number of finished products in a width direction.

In this application, A is the spacing between the raw material and each of the finished products or between the finished products.

L is a length of the raw material, and W is a width of the raw material.

x is a length of a finished product, and y is a width of the finished product.

$\eta_{ij}$ represents a raw material utilization rate when producing a i-th finished product from a j-th raw material.

rateLimit is a lower limit of a raw material utilization rate.

$y_j$ represents whether the j-th raw material is used, and $x_{ij}$ represents whether the j-th raw material is selected for the i-th finished product.

$i \in (1, 2, \ldots, m)$ is a serial number of a finished product, indicating that it is required to allocate raw materials to m finished products.

$j \in (1, 2, \ldots, n)$ is a serial number of a feasible raw material size, indicating that there are n feasible raw material sizes for allocation.

$u_{ij}$ represents the number of j-th raw materials for cutting the i-th finished product, and $S_j$ is an area of the j-th raw material.

$L_{min}$ is a lower limit of the raw material length, and $L_{max}$ is an upper limit of the raw material length.

$W_{min}$ is a lower limit of the raw material width, and $W_{max}$ is an upper limit of the raw material width.

In an embodiment, in the step (b), the initial feasible raw material size set of a certain finished product is obtained through steps (b1) to (b3).

(b1) xNum and yNum are initialized to 1.

(b2) According to the formulas (1) and (2), the raw material size with the highest utilization rate is calculated.

(b3) It is judged whether the raw material size with the highest utilization rate exceeds a raw material size limit. If not, the optimal raw material size is added to the initial feasible raw material size set; the number of finished products in the length direction is kept at xNum; and the number of finished products in the width direction is adjusted to yNum+1; and the step (b2) is performed. If yes, it is determined whether the optimal raw material size exceeds the raw material size limit in the length direction. If yes, the optimal raw material size is output to obtain the initial feasible raw material size set. If not, the number of finished products in the length direction is adjusted to xNum+1, and the number of finished products in the width direction is reset to 1; and the step (b2) is performed.

Figure 3:
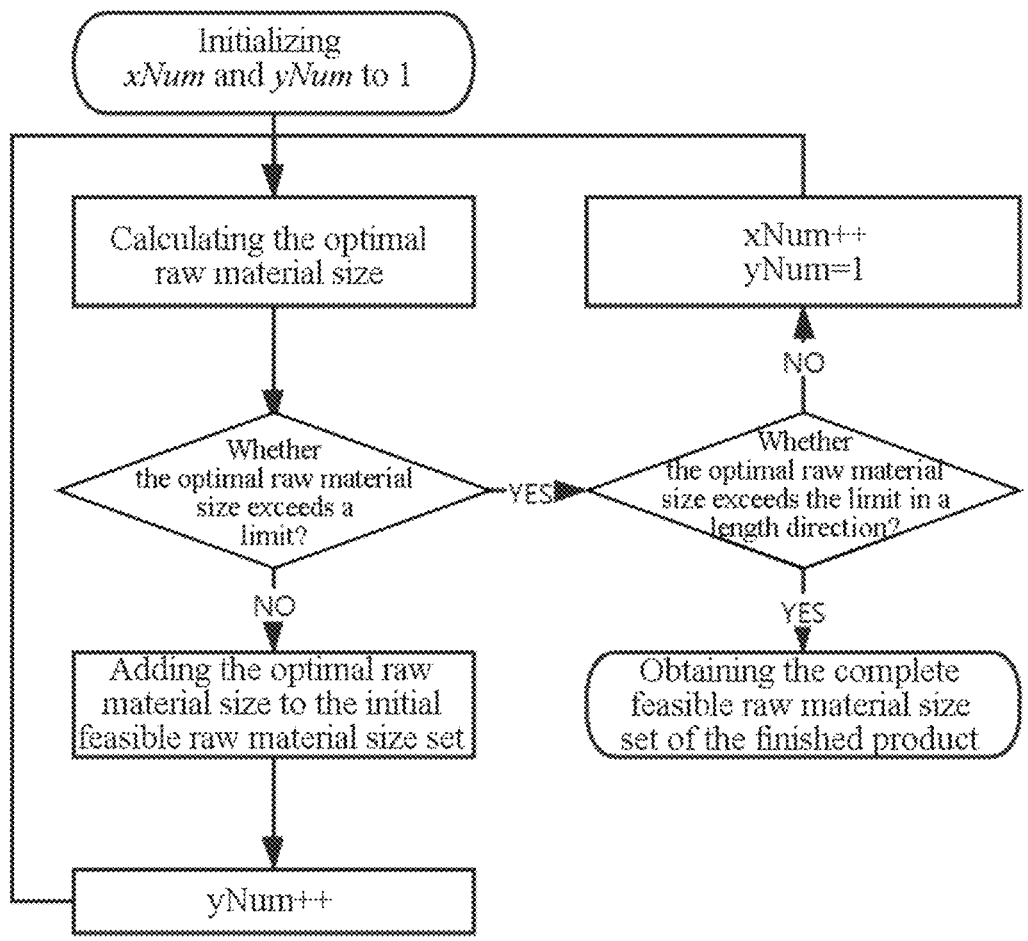
FIG. 3 is a flow chart of obtaining a feasible raw material size of a certain finished product according to one embodiment of the present disclosure.

As shown in FIG. 3, in this way, according to the formulas (1) and (2), the raw material size with the highest utilization rate is calculated. The obtained raw material size that meets the size limit are added to the initial feasible raw material size set, and the initial feasible raw material size set is obtained by continuous cyclic operation.

In an embodiment, finished product cutting and raw material selection are required to satisfy the following criteria.

A spacing between the finished products and a spacing between each of the finished products and the raw material are both kept at A.

The finished products are aligned with and parallel to each other.

One piece of the raw material is only used to be cut into multiple finished products with the same size and rotation angle.

One finished product only corresponds to one type of raw material.

The raw material size is limited to $L_{min} \leq x \leq L_{max}$, and $W_{min} \leq y \leq W_{max}$.

Figure 2:
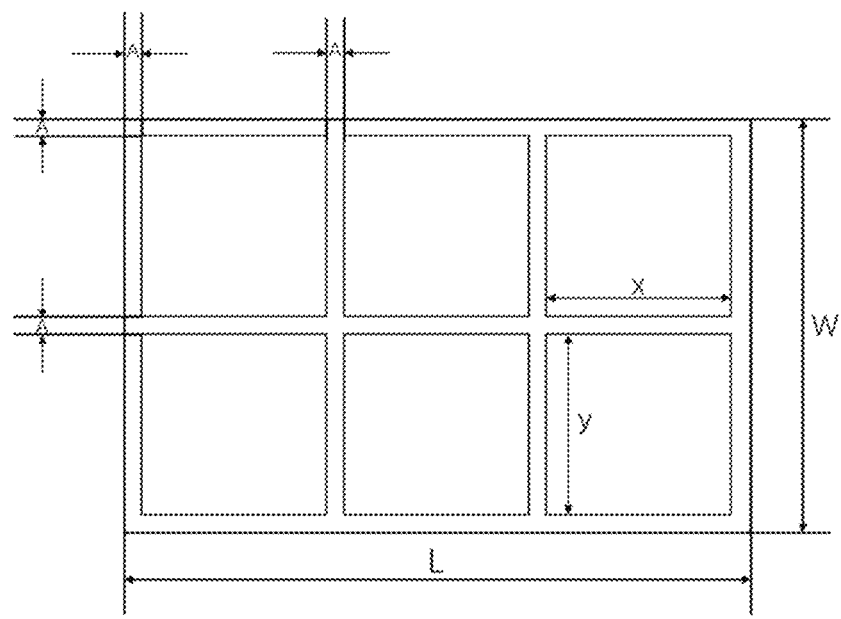
FIG. 2 schematically shows how a BEF finished product is cut according to one embodiment of the present disclosure.

As shown in FIG. 2, in order to facilitate cutting while ensuring maximum raw material utilization, the finished product cutting and raw material selection need to comply with the above rules.

Specifically, in an embodiment, the step (c) includes mapping a length x and a width y of each raw material in the initial feasible raw material size set onto two coordinate axes perpendicular to each other, respectively, to obtain a length x set and a width y set; and combining elements in the length x set with elements in the width y set in pairs to obtain the complete feasible raw material size set.

In the step (c), it is assumed that all initial feasible raw material sizes in the initial feasible raw material size set are [L1, W1], [L2, W2], [L3, W3], and [L4, W4]. The length x set and the width y set generated by mapping the length x and width y of the initial feasible raw material sizes onto the two coordinate axes perpendicular to each other are respectively {L1, L2, L3, L4} and {W1, W2, W3, W4}.

The complete feasible raw material size set obtained by combining elements in the set {L1, L2, L3, L4} with elements in the set {W1, W2, W3, W4} in pairs consists of [L1, W1], [L1, W2], [L1, W3], [L1, W4], [L2, W1], [L2, W2], [L2, W3], [L2, W4], [L3, W1], [L3, W2], [L3, W3], [L3, W4], [L4, W1], [L4, W2], [L4, W3], and [L4, W4].

Because the generated initial feasible raw material size set are the smallest raw material size obtained by a certain finished product according to a certain cutting scheme, the initial feasible raw material size set is incomplete. Because only the raw material with the highest utilization rate for each finished product is obtained. After limiting the type of raw material, it is likely to cause most of the finished products to select poor raw materials. Therefore, we need to further expand the feasible raw material set and combine the characteristics between different finished products to obtain some larger raw material size, so that the utilization rate of multiple finished products on one raw material is better.

In the disclosure, the step (d) includes steps (d1) to (d7).

(d1) A first element in the complete feasible raw material size set is selected as an initial test object.

(d2) It is determined whether there is a cuttable finished product for a current test object: if yes, proceed to step (d3); otherwise, proceed to step (d4).

(d3) It is determined whether there is at least one element in the complete feasible raw material size set whose utilization rate for each finished product is higher than a utilization rate of the current test object: if yes, proceeding to step (d4); otherwise, proceeding to step (d5).

(d4) The current test object is removed from the complete feasible raw material size set.

(d5) It is determined whether the complete feasible raw material size set has been traversed: if yes, proceed to step (d7); otherwise, proceed to step (d6).

(d6) A next element in the complete feasible raw material size set is selected as a current test object, and return to step (d2).

(d7) The unreasonable raw material size is completely deleted.

Figure 4:
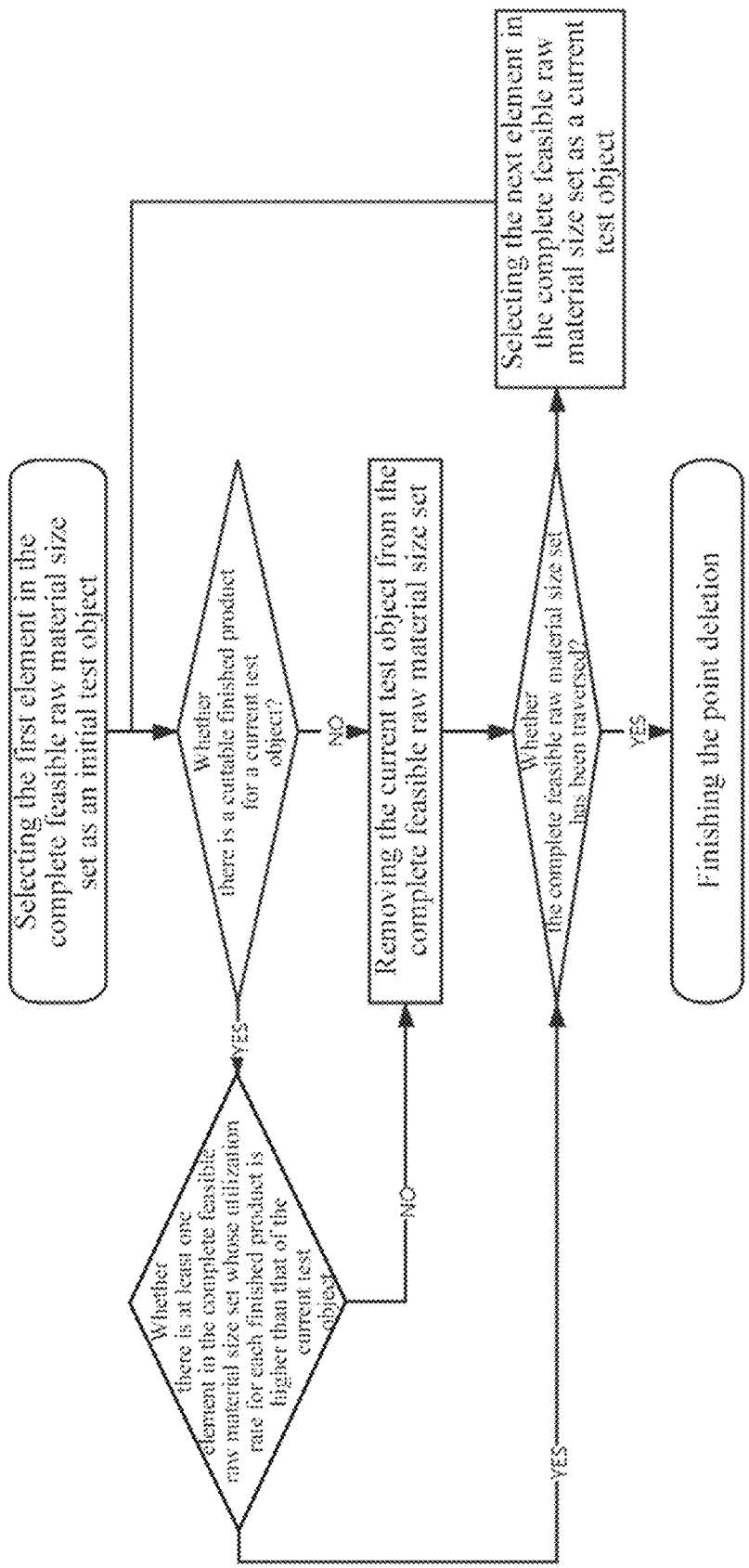
FIG. 4 is a flow chart showing a point deletion process according to one embodiment of the present disclosure.
Figure 5:
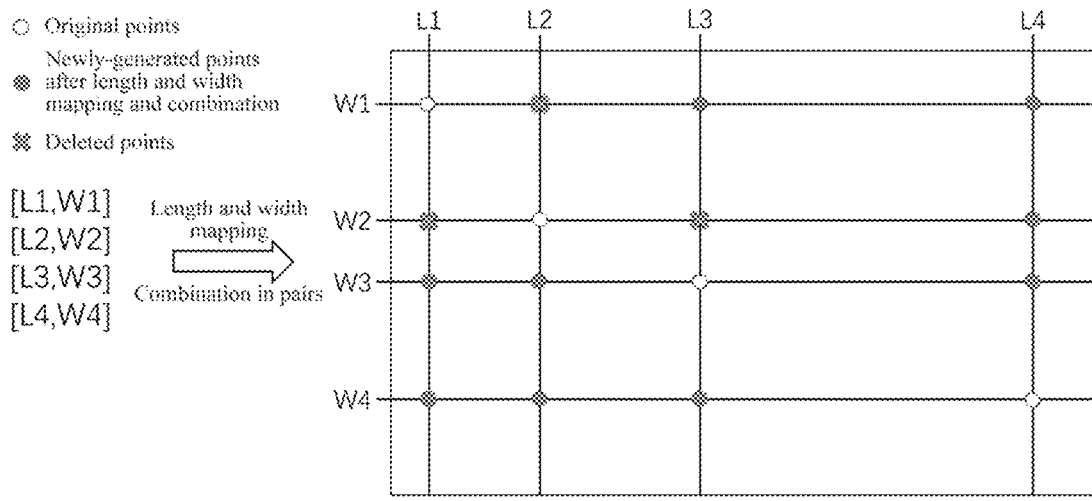
FIG. 5 is a schematic diagram showing mapping, combination, and deletion processes according to one embodiment of the present disclosure.

As shown in FIGS. 4-5, after mapping in the length and width directions, some special combinations in the complete feasible raw material size set are obviously not suitable for any finished product or have another very suitable substitute, such as a combination containing a minimum x or minimum y. Such a combination may only be useful for the finished products with a minimum x or y size and useless for most finished products. If y of the finished product with minimum x is large, it will lead to lots of useless combinations. To solve this problem, we use the deletion operation, traverse the feasible raw material size set obtained after mapping, delete some unreasonable raw material sizes, and effectively reduce the model scale without affecting the quality of the solution.

The unreasonable sizes refer to the raw material size unable to cut any one finished product. If the current raw material size is set to $S_1$, there is another raw material size $S_2$, and for the cutting utilization rate for each finished product, $S_1$ is always lower than $S_2$, and $S_1$ is considered to the unreasonable size.

In an embodiment, the integer programming model is built through the following steps.

A first objective function is built according to quantity and type of a known finished product, wherein the first objective function is configured to minimize a total area of raw materials consumed for cutting of all finished products, expressed as:

$$\text{Minimize } Z_1 = \sum_{j=1}^{n}\sum_{i=1}^{m}(x_{ij} \times S_j \times u_{ij}). \quad (3)$$

A second objective function is built, wherein the second objective function is configured to minimize the number of procurement types of the raw materials, expressed as:

$$\text{Minimize } Z_2 = \sum_{j=1}^{n} y_j. \quad (4)$$

According to the first objective function and the second objective function, a multi-objective integer programming model is established by multiplying the first objective function by a weight coefficient $k_1$ and multiplying the second objective function by a weight coefficient $k_2$, to transform a multi-objective problem into a single-objective problem. An integrated target is modeled and solved through formula (5):

$$\text{Minimize } Z = k_1 \times Z_1 + k_2 \times Z_2 \quad (5).$$

There are three constraints for the integrated target.

Constraint 1: each type of finished products matches only one raw material size, expressed as:

$$\sum_{j=1}^{n} x_{ij} = 1, \forall i. \quad (6)$$

Constraint 2: when a raw material matches with at least one type of finished products, $y_j=1$, indicating that the raw material is selected:

$$\sum_{i=1}^{m} x_{ij} \le y_j \times \infty, \forall j. \quad (7)$$

Constraint 3: variables are limited as follows:

$$\begin{cases} x_{ij} \in [0, 1] \\ y_j \in [0, 1] \end{cases}. \quad (8)$$

Figure 6:
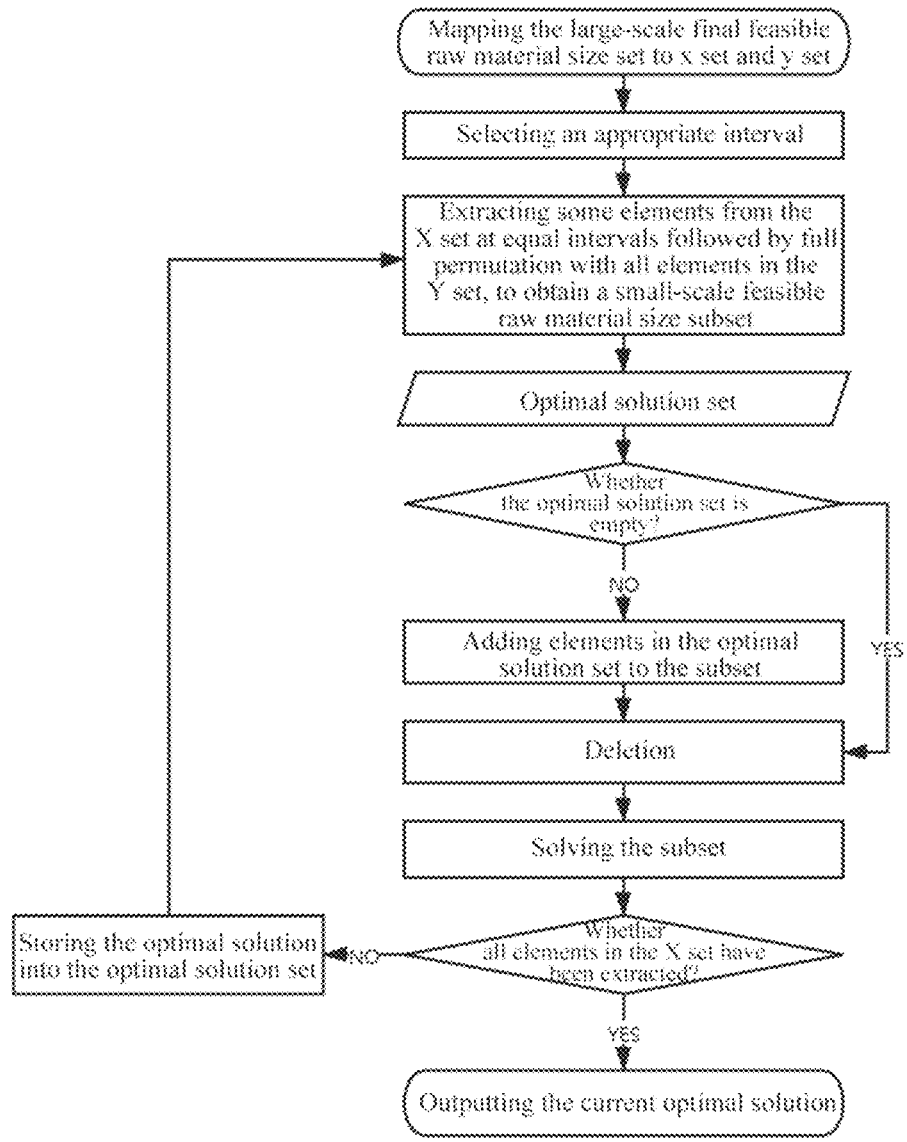
FIG. 6 is a flowchart of batchwise extracting elements from the x set according to one embodiment of the present disclosure.
Figure 7:
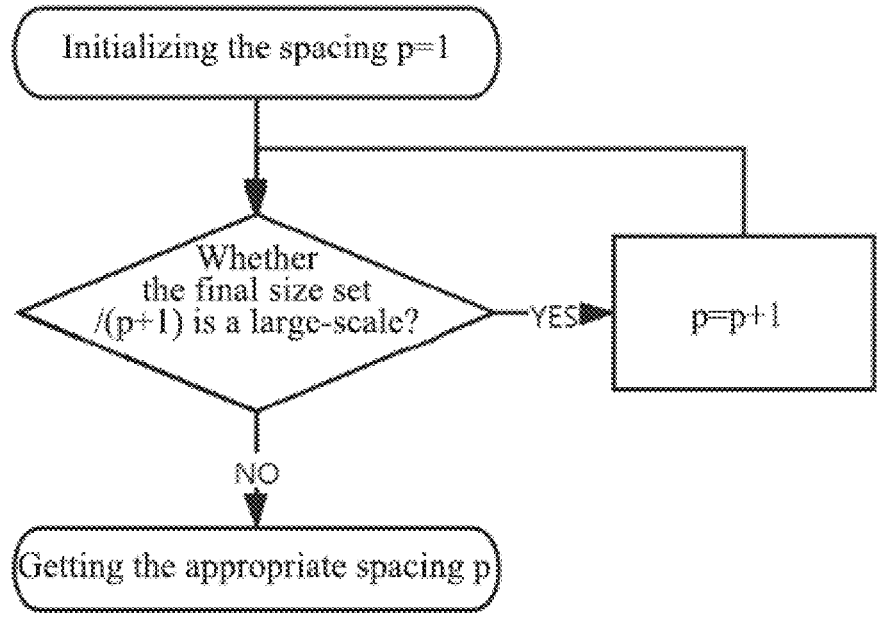
FIG. 7 is a flowchart of selecting an appropriate spacing in FIG. 6.
Figure 8:
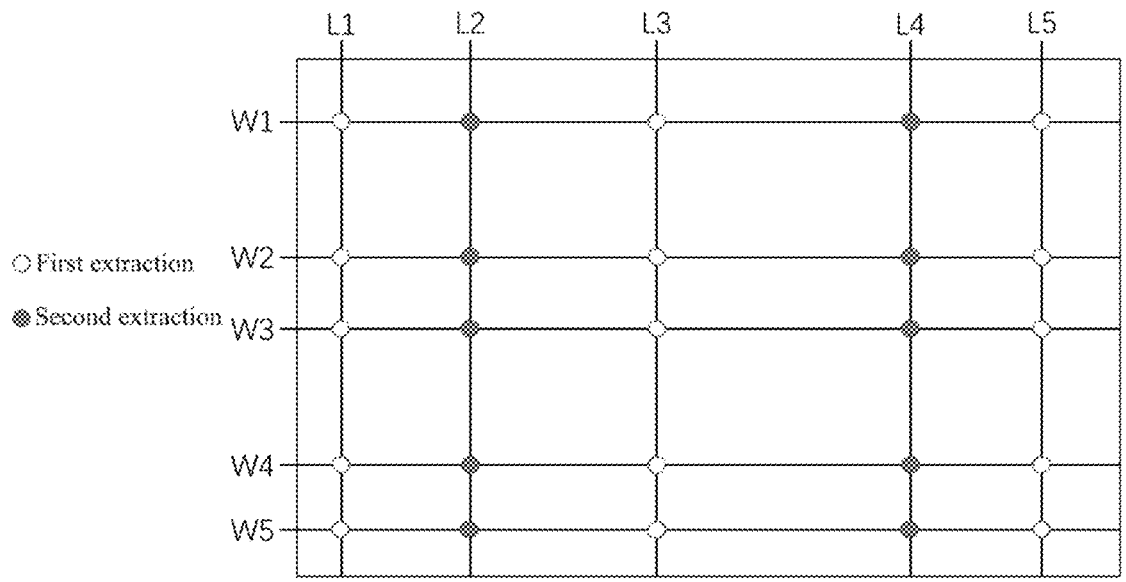
FIG. 8 is a schematic diagram showing an equal-interval extraction according to one embodiment of the present disclosure.

As shown in FIGS. 6 to 8, for manufacturing enterprises, the utilization rate of the raw materials is an important indicator affecting production costs, and the improvement of the raw material utilization can significantly reduce production costs. Since the type and number of finished products are known when the model is established, in order to obtain the maximum average utilization of the raw materials, only the cutting process of all finished products needs to be completed with the minimum raw material area to achieve the goal optimization. Through enterprise research, it is known that the more types of raw material sizes are not the better. There are too many types, and the difficulty of enterprises to classify and manage raw materials increases, resulting in increased management costs. Therefore, the second objective function is set up to optimize the target of the procurement specifications and types of the raw materials.

In an embodiment, in the step (e1) or (e2), the integer programming model is solved by a mathematical optimization technique integrating a minimum finished product utilization limit strategy and a batch recursive processing strategy.

A minimum utilization threshold is set, such as utilization rate U>40%, and finished products and raw materials with a utilization rate below the minimum utilization threshold are discarded by an equation constraint. The integer programming model is solved to ensure that a minimum utilization rate of the finished products and raw materials is greater than the minimum utilization threshold:

$$\begin{cases} x_{ij} = 0, \eta_{ij} < rateLimit \\ x_{ij} \in [0, 1], \eta_{ij} \ge rateLimit \end{cases}. \quad (9)$$

I LOG CPLEX mathematical optimization techniques are primarily used to improve efficiency, implement strategies quickly, and increase profitability. I LOG CPLEX mathematical optimization technique makes better decisions about the efficient use of resources. With I LOG CPLEX, complex business problems can be transformed into Mathematic Programming models. Advanced optimization algorithms can quickly find a solution to the models.

In an embodiment, in step (e2), the integer programming model is solved by the batch recursive processing strategy through the steps (e21) to (e7).

(e21) An X set and a Y set are obtained by mapping the final feasible raw material size set to an x set and a y set, and subjecting the final feasible raw material size set to deduplication respectively with respect to length and width.

For example, [L1, W1], [L1, W2], [L1, W3], [L1, W4], [L1, W5]; [L2, W1], [L2, W2], . . . , [L5, W1], [L5, W2], [L5, W3], [L5, W4], and [L5, W5] are mapped to obtain the X set of {L1, L2, L3, L4, L5} and Y set of {W1, W2, W3, W4, W5}.

(e22) Some elements are extracted from the X set at equal intervals followed by full permutation with all elements in the Y set to obtain a feasible raw material size subset.

In this embodiment, X set of {L1, L3, L5} and Y set of {W1, W2, W3, W4, W5} are performed with the first extraction to obtain the feasible raw material size subsets of [L1, W1], [L1, W2], [L1, W3], [L1, W4], [L1, W5]; [L3, W1], [L3, W2], [L3, W3], [L3, W4], [L3, W5]; [L5, W1], [L5, W2], [L5, W3], [L5, W4], and [L5, W5].

X set of {L2, L4} and Y set of {W1, W2, W3, W4, W5} are performed with the second extraction to obtain the feasible raw material size subsets of [L2, W1], [L2, W2], [L2, W3], [L2, W4], [L2, W5]; [L4, W1], [L4, W2], [L4, W3], [L4, W4], and [L4, W5].

The first extraction starts from the rightmost end of the X set to ensure that the first batch of subsets must contain the largest raw materials, thereby avoiding the situation that the subproblem is unsolvable, take outs every other element, and finally take out L1, L3, and L5 to combine with Y set in pairs. The point set of hollow dots is the subset obtained by the first extraction. The second extraction shifts from the rightmost of the X set towards left by one bit, then starts to extract, takes out every other element, and finally took out L2 and L4 to combine with Y set in pairs. The point set of solid dots is the subset obtained by the first extraction.

(e23) It is determined whether an optimal solution set is empty. If yes, indicate that it is a first batch solution operation, and proceed to step (e25), otherwise, proceed to step (e24).

(e24) The optimal solution is added to the optimal solution set.

(e25) Point deletion is performed on the feasible raw material size subset, and the point deletion method herein is the same as the point deletion method in small-scale solving.

(e26) The feasible raw material size subset is solved to obtain an optimal solution subset, and the model used to solve the subset is consistent with the mathematical model used in the small-scale subset to obtain the optimal solution of the subset.

(e7) It is determined whether all elements in the X set have been extracted. If yes, determine an optimal solution of a current subset as an optimal solution of an original problem, and output the optimal solution of the current subset; otherwise, return to the step (e22).

The above is an explanation for the process of equidistant extraction of the X set. The process of equidistant extraction of Y set is the same as the process of equidistant extraction of the X set, and it only needs to extract the Y sets at equal distance to combine with the X sets.

Solving large-scale or hyperscale models can significantly slow down model solving and may even cause memory overflow problems. In order to solve this problem and make the large-scale model solve a better solution in a short time, the strategy of batch division and recursion are adopted. The feasible raw material size set of the large-scale model is extracted as the feasible raw material set of the small model for solving, and the large-scale model is decomposed into a small-scale model for solving to improve the solution speed. The large-scale feasible raw material size set is remapped back to x and y, and then x is selected at equal intervals to combine with all y, and y is selected to combine with all x, forming the small-scale feasible raw material size set. After solving the small-scale problem, the better raw material size selected by the model is stored in an optimal size set, and the previously obtained better size is added to solve the small-scale problem in each subsequent iterative solution. Such an arrangement can save the better sizes and filter out the poor sizes by each small-scale solution.

According to the above model, the optimization solution is performed for test cases composed of 77 finished products, which takes 360 s. Partial solution results are shown in Table 1.

TABLE 1

Matching table of the finished product and the raw material

| ID | x | y | NeedNum | SemiSize | xNum | yNum | Rate |
|---|---|---|---|---|---|---|---|
| 1 | 1670 | 949 | 2900 | (1680, 960) | 1 | 1 | 98.27% |
| 2 | 810 | 295 | 2000 | (1680, 960) | 2 | 3 | 98.09% |
| 3 | 1230 | 701 | 6000 | (1240, 710) | 1 | 1 | 97.94% |
| 4 | 1093 | 623 | 6000 | (1105, 630) | 1 | 1 | 97.81% |
| 5 | 959 | 543 | 9800 | (970, 550) | 1 | 1 | 97.61% |
| 6 | 1094 | 620 | 15900 | (1105, 630) | 1 | 1 | 97.43% |
| 7 | 1230 | 697 | 19250 | (1240, 710) | 1 | 1 | 97.38% |
| 8 | 708 | 403 | 98100 | (715, 410) | 1 | 1 | 97.33% |
| 9 | 708 | 403 | 8000 | (715, 410) | 1 | 1 | 97.33% |
| 10 | 807 | 348 | 292700 | (815, 355) | 1 | 1 | 97.07% |
| 11 | 807 | 348 | 29200 | (815, 355) | 1 | 1 | 97.07% |
| 12 | 707 | 402 | 67500 | (715, 410) | 1 | 1 | 96.95% |
| 13 | 708 | 401 | 3730 | (715, 410) | 1 | 1 | 96.85% |
| 14 | 542 | 952 | 33900 | (970, 550) | 1 | 1 | 96.72% |
| ... | ... | ... | ... | ... | ... | ... | ... |

In Table 1, ID is the serial numbers of the finished products. x is the length of the finished product, and unit is mm; and y is the width of the finished product, and unit is mm. NeedNum is the number for the needed finished product. SemiSize is the size of the raw material corresponding to the finished product, that is, the width and length of the raw material. xNum is the number of the finished products in a length direction thereof, and yNum is the number of the finished products in a width direction thereof. Rate is the utilization rate of the raw material used for the finished product.

Figure 9:
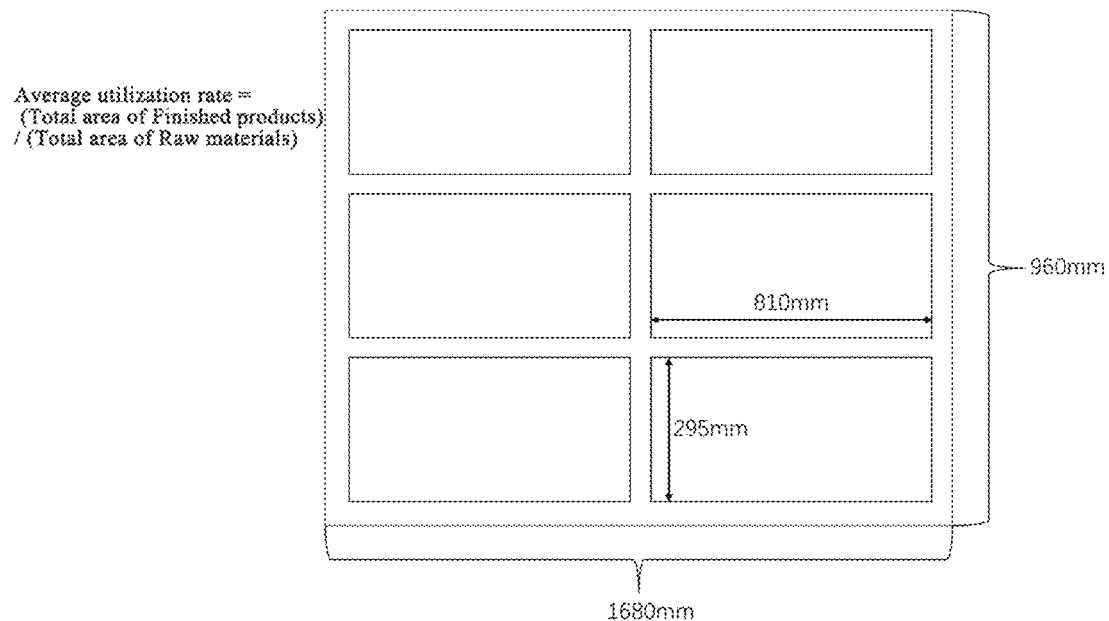
FIG. 9 is a schematic diagram showing cutting results according to one embodiment of the present disclosure.

As shown in FIG. 9, in the second row of the Table 1, 2000 finished product with the length of 810 mm and the width of 295 mm are required, the length of the corresponding raw material is 1680 mm, the width of the corresponding raw material is 960 mm, the cutting method is 2×3, and the average utilization rate of the raw material is 98.09%.

TABLE 2

Results when 13 raw materials are used

| Type of finished product | Type of raw material | Average utilization rate | Total area of raw materials | Size of raw material |
|---|---|---|---|---|
| 77 | 13 | 95.78% | 932799.47 | (400, 640); (535, 680); (545, 725); (550, 630); (615, 705); (615, 715); (620, 550); (630, 715); (675, 535); (700, 615); (720, 410); (845, 505); (970, 570) |

Table 2 shows the average utilization rate and the total area of the raw materials, and the size set of corresponding raw materials when using 13 raw materials. For 77 finished products, the optimal average utilization rate of 13 raw materials is 95.78%, the total area of raw materials used is 932799.47 $mm^2$, and the 13 corresponding raw material sizes (length, width) are (400, 640), (535, 680), (545, 725), (550, 630), (615, 705), (615, 715), (620, 550), (630, 715), (675, 535), (700, 615), (720, 410), (845, 505), and (970, 570).

This application further provides a dynamic optimization system for procurement specifications of BEF raw materials using the dynamic optimization method described above.

Figure 10:
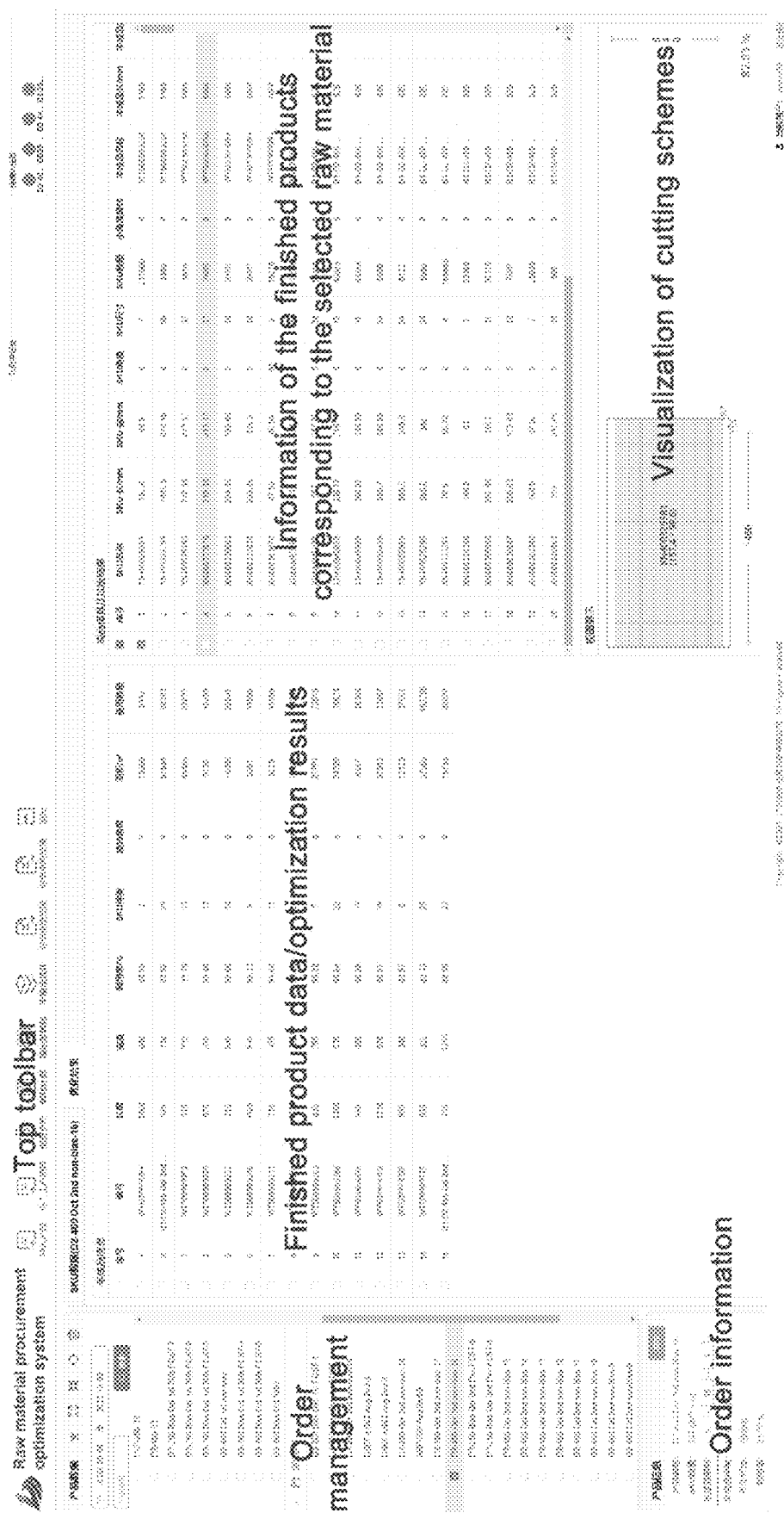
FIG. 10 is a system interface according to one embodiment of the present disclosure.

The dynamic optimization system includes an order management module, a finished product data module, an optimization result module, and a cutting scheme display module. The system interface is shown in FIG. 10. The order management module provides functions such as a download template, a database update function, a time selector, a search bar, an order data tree list.

Download template provides users with a reference upload template to help users upload order data correctly. Database update function helps to get the order data in the latest database. Time selector filters the order data for the user within the selected period. Search bar supports fuzzy inquiry of the order through the serial numbers, convenient for users to quickly find the order data that needs to be optimized. Order data tree list branches the order data according to the time of order data import, which is convenient for user management.

The finished product data module is used to display the finished product data, the finished product name, the finished product length and width, and the number of needed finished product in the orders selected in the order management module.

The optimization result module is used to optimize the raw material information, show the average utilization rate of the raw materials, and the number of the finished products. The selected raw material corresponds to the information of the finished products, and the user can click to check the cutting plan of the finished product corresponding to a certain raw material.

After optimization, for the checked finished product, the system will draw the cutting diagram in the view display column by the cutting scheme display module, which contains the finished product size, the finished product name, the raw material size and the raw material utilization rate.

As used herein, the terms "embodiment", "example", etc. refer to specific features, structures, materials or characteristics described in conjunction with the embodiments or examples included in at least one embodiment or example of the disclosure. The terms do not always refer to the same embodiment or example. The specific features, structures, materials or characteristics described may be combined in a suitable manner in any one or more embodiments or examples.

The technical principles and solutions of the disclosure have been described in detail above in conjunction with embodiments. These embodiments are only illustrative of the present disclosure, and are not intended to limit the present disclosure. It should be understood that other embodiments made by those skilled in the art based on the content disclosed herein without paying creative effort should fall within the scope of the disclosure defined by the appended claims.

What is claimed is:

1. A dynamic optimization method for procurement specifications of brightness enhancement film (BEF) raw materials, comprising:
   (a) obtaining finished product data according to order information within a preset period;
   (b) according to the finished product data, generating an optimal raw material size corresponding to individual finished products to obtain an initial feasible raw material size set;
   (c) mapping the initial feasible raw material size set in length and width directions to obtain a complete feasible raw material size set;
   (d) removing an unreasonable raw material size from the complete feasible raw material size set to obtain a final feasible raw material size set; and
   (e) judging whether a scale of the final feasible raw material size set is larger than a preset threshold:
   (e1) if not, building an integer programming model based on the final feasible raw material size set; solving the integer programming model, and outputting results; and
   (e2) if yes, performing batch processing on the final feasible raw material size set to obtain multiple subsets; building an integer programming model for each of the subsets; and solving the integer programming model, and outputting results.

2. The dynamic optimization method of claim 1, wherein in the step (b), according to a finished product cutting rule, the optimal raw material size is derived by combining the finished products;
   according to a finished product size and the number of single side blanks in both the length and width directions, the optimal raw material size is expressed by formulas (1) and (2):

$$W_{best} = x \times xNum + A \times (xNum+1) \quad (1); \text{ and}$$

$$L_{best} = y \times yNum + A \times (yNum+1) \quad (2);$$

wherein x is a length of each of the finished products; y is a width of each of the finished products; A is a spacing between a raw material and each of the finished products or between the finished products, xNum is the number of finished products in a length direction, and yNum is the number of finished products in a width direction.

3. The dynamic optimization method of claim 2, wherein in the step (b), the initial feasible raw material size set of a certain finished product is obtained through steps of:
   (b1) initializing xNum and yNum to 1;
   (b2) calculating the optimal raw material size according to the formulas (1) and (2);
   (b3) judging whether the optimal raw material size exceeds a raw material size limit:
   if not, adding the optimal raw material size to the initial feasible raw material size set; keeping the number of finished products in the length direction at xNum, and adjusting the number of finished products in the width direction to yNum+1, and returning to the step (b2); and
   if yes, determining whether the optimal raw material size exceeds the raw material size limit in the length direction: if yes, outputting the optimal raw material size to obtain the initial feasible raw material size set; and if not, adjusting the number of finished products in the length direction to xNum+1, and resetting the number of finished products in the width direction to 1, and returning to the step (b2).

4. The dynamic optimization method of claim 2, wherein finished product cutting and raw material selection are required to satisfy the following criteria:
   the spacing between the finished products and the spacing between each of the finished products and the raw material are both kept at A;
   the finished products are aligned with and parallel to each other;
   one piece of the raw material is only used to be cut into multiple finished products with the same size and rotation angle;
   one finished product only corresponds to one type of raw material; and
   the raw material size is limited to $L_{min} \leq x \leq L_{max}$, and $W_{min} \leq y \leq W_{max}$.

5. The dynamic optimization method of claim 1, wherein the step (c) comprises:
   mapping a length x and a width y of each raw material in the initial feasible raw material size set onto two coordinate axes perpendicular to each other, respectively, to obtain a length x set and a width y set; and combining elements in the length x set with elements in the width y set in pairs to obtain the complete feasible raw material size set;
   in the step (c), assuming that all initial feasible raw material sizes in the initial feasible raw material size set are [L1, W1], [L2, W2], [L3, W3], and [L4, W4], and the length x set and the width y set generated by mapping the length x and width y of the initial feasible raw material sizes in the initial feasible raw material size set onto the two coordinate axes perpendicular to each other are respectively {L1, L2, L3, L4} and {W1, W2, W3, W4}; and
   the complete feasible raw material size set obtained by combining elements in the set {L1, L2, L3, L4} with elements in the set {W1, W2, W3, W4} in pairs consists of [L1, W1], [L1, W2], [L1, W3], [L1, W4], [L2, W1], [L2, W2], [L2, W3], [L2, W4], [L3, W1], [L3, W2], [L3, W3], [L3, W4], [L4, W1], [L4, W2], [L4, W3], and [L4, W4].

6. The dynamic optimization method of claim 1, wherein the step (d) comprises:

(d1) selecting a first element in the complete feasible raw material size set as an initial test object;

(d2) determining whether there is a cuttable finished product for a current test object: if yes, proceeding to step (d3); otherwise, proceeding to step (d4);

(d3) determining whether there is at least one element in the complete feasible raw material size set whose utilization rate for each finished product is higher than a utilization rate of the current test object: if yes, proceeding to step (d4); otherwise, proceeding to step (d5);

(d4) removing the current test object from the complete feasible raw material size set;

(d5) determining whether the complete feasible raw material size set has been traversed: if yes, proceeding to step (d7); otherwise, proceeding to step (d6);

(d6) selecting a next element in the complete feasible raw material size set as a current test object and returning to step (d2); and (d7) completing deletion of the unreasonable raw material size.

7. The dynamic optimization method of claim 1, wherein the integer programming model is built through steps of:

building a first objective function according to quantity and type of a known finished product, wherein the first objective function is configured to minimize a total area of raw materials consumed for cutting of all finished products, expressed as:

$$\text{Minimize } Z_1 = \sum_{j=1}^{n}\sum_{i=1}^{m}(x_{ij} \times S_j \times u_{ij}); \quad (3)$$

building a second objective function, wherein the second objective function is configured to minimize the number of procurement types of the raw materials, expressed as:

$$\text{Minimize } Z_2 = \sum_{j=1}^{n} y_j; \text{ and} \quad (4)$$

establishing a multi-objective integer programming model according to the first objective function and the second objective function; obtaining an integrated target, by multiplying the first objective function by a weight coefficient $k_1$ and multiplying the second objective function by a weight coefficient $k_2$, to transform a multi-objective problem into a single-objective problem, expressed as:

$$\text{Minimize } Z = k_1 \times Z_1 + k_2 \times Z_2 \quad (5);$$

wherein there are three constraints for the integrated target;

constraint 1: each type of finished products matches only one raw material size, expressed as:

$$\sum_{j=1}^{n} x_{ij} = 1, \forall i; \quad (6)$$

constraint 2: when a raw material matches with at least one type of finished products, $y_j=1$, indicating that the raw material is selected:

$$\sum_{i=1}^{m} x_{ij} \leq y_j \times \infty, \forall j; \text{ and} \quad (7)$$

constraint 3: variables are limited as follows:

$$\begin{cases} x_{ij} \in [0, 1] \\ y_j \in [0, 1] \end{cases}; \quad (8)$$

wherein x is a length of a finished product; y is a width of the finished product;

$y_j$ represents whether a j-th raw material is used; $x_{ij}$ represents whether the j-th raw material is selected for an i-th finished product;

$i \in (1, 2, \ldots, m)$ is a serial number of a finished product, indicating that it is required to allocate raw materials to m finished products;

$j \in (1, 2, \ldots, n)$ is a serial number of a feasible raw material size, indicating that there are n feasible raw material sizes for allocation;

$u_{ij}$ represents the number of j-th raw materials for cutting the i-th finished product; and $S_j$ is an area of the j-th raw material.

8. The dynamic optimization method of claim 7, wherein in the step (e1) or (e2), the integer programming model is solved by a mathematical optimization technique integrating a minimum finished product utilization limit strategy and a batch recursive processing strategy;

a minimum utilization threshold is set, and raw materials with a utilization rate below the minimum utilization threshold are discarded by an equation constraint, and the integer programming model is solved to ensure that a minimum utilization rate of the raw materials is greater than the minimum utilization threshold:

$$\begin{cases} x_{ij} = 0, \eta_{ij} < \text{rateLimit} \\ x_{ij} \in [0, 1], \eta_{ij} \geq \text{rateLimit} \end{cases}; \quad (9)$$

wherein $\eta_{ij}$ represents the utilization rate of the raw material when producing the i-th finished product from the j-th raw material, and rateLimit is a lower limit of a raw material utilization rate.

9. The dynamic optimization method of claim 8, wherein in step (e2), the integer programming model is solved by the batch recursive processing strategy through the following steps:

(e21) mapping the final feasible raw material size set to an x set and a y set, and subjecting the final feasible raw material size set to deduplication respectively with respect to length and width to obtain an X set and a Y set;

(e22) extracting some elements from the X set at equal intervals followed by full permutation with all elements in the Y set to obtain a feasible raw material size subset;

(e23) determining whether an optimal solution set is empty; if yes, indicating that it is a first batch solution operation, and proceeding to step (e25); otherwise, proceeding to step (e24);

(e24) adding an optimal solution to the optimal solution set;

(e25) performing point deletion on the feasible raw material size subset;

(e26) solving the feasible raw material size subset to obtain an optimal solution of the feasible raw material size subset; and (f7) determining whether all elements in the X set have been extracted: if yes, determining an optimal solution of a current subset as an optimal solution of an original problem, and outputting the optimal solution of the current subset; otherwise, returning to the step (e22).

10. A system for of BEF implementing the dynamic optimization method of claim 1.

* * * * *